United States Patent [19]

Crossley

[11] Patent Number: 5,020,698
[45] Date of Patent: Jun. 4, 1991

[54] ICE-CREAM EJECTOR

[76] Inventor: Jimmy L. Crossley, 3218 Nebraska Ave., Council Bluffs, Iowa 51501

[21] Appl. No.: 197,426

[22] Filed: May 23, 1988

[51] Int. Cl.$^5$ .............................................. B67D 5/42
[52] U.S. Cl. .................................. 222/386; 222/409; 425/190; 425/376.1
[58] Field of Search ............ 222/309, 340, 386, 386.5, 222/409; 99/460, 646 R; 425/308, 190, 376.1, 377

[56] References Cited

U.S. PATENT DOCUMENTS

| | | | |
|---|---|---|---|
| 295,492 | 3/1884 | Grout | 222/386 X |
| 1,397,510 | 11/1921 | Grassi | 222/386 X |
| 1,581,074 | 4/1926 | MacFarland | 222/386 X |
| 2,218,598 | 10/1940 | Brown | 222/386 X |
| 2,533,282 | 12/1950 | Osman | 99/460 X |
| 2,745,575 | 5/1956 | Spencer | 222/327 |
| 4,057,874 | 11/1977 | Walker, Jr. | 17/32 |
| 4,316,558 | 2/1982 | Kubiak | 222/386 X |
| 4,668,561 | 5/1987 | Nev | 222/386 X |

Primary Examiner—Joseph J. Rolla
Assistant Examiner—Gregory L. Huson

[57] ABSTRACT

An ice-cream ejector for ejecting ice-cream filled with solid ingredients into an edible cone from a cup having a lower outlet. The cup is supported on a sliding shelf. A piston is pressed downwardly into the cup by a hand lever to press the ice cream out. The piston is quickly removable from the ejector for cleaning. A flexible resilient header extends across the underside of the piston and is removable for cleaning. A disposable piston cover of wax paper clings to the piston header as the piston retracts. The piston has an inclined wall portion guiding the piston into alignment with the cup during piston entry. Visibility of the outlet during cone-filling is increased by a notch in the shelf and by having the cup outlet below the shelf.

1 Claim, 2 Drawing Sheets

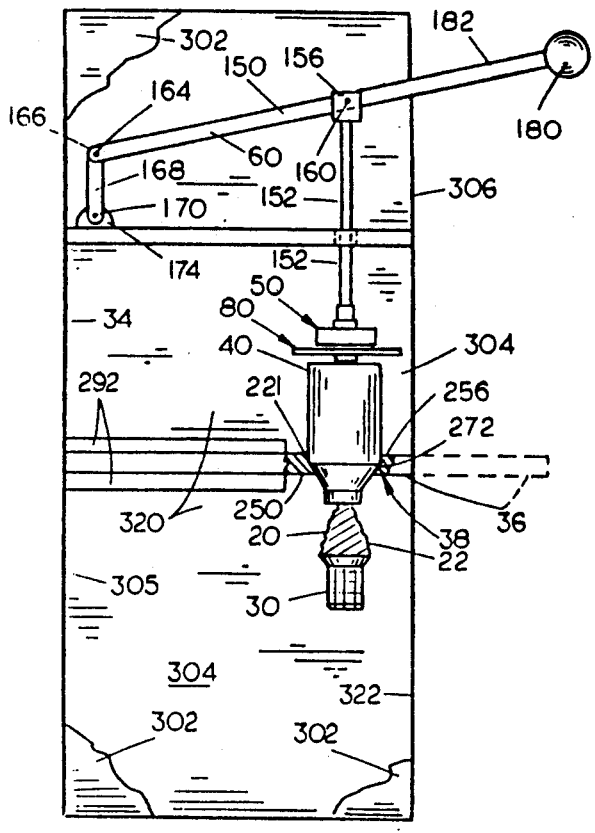
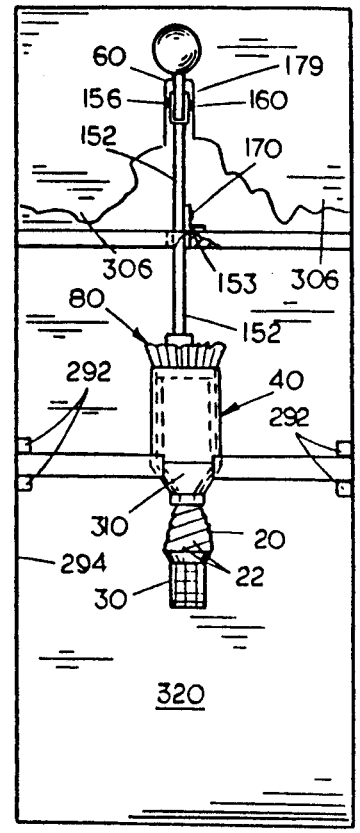
FIG. 1
FIG. 2
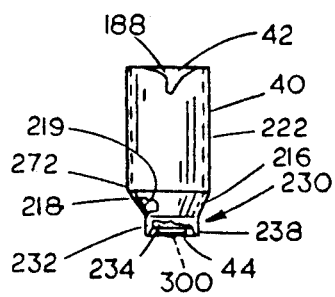
FIG. 3
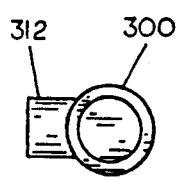
FIG. 4A
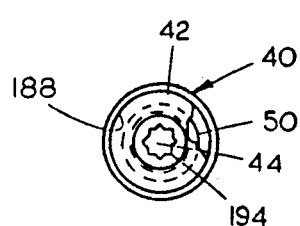
FIG. 4
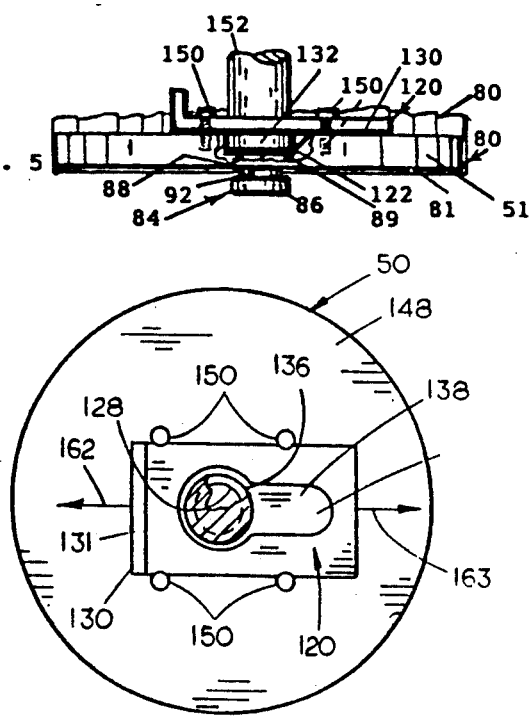
FIG. 5
FIG. 6

ICE-CREAM EJECTOR

BACKGROUND OF THE INVENTION

Heretofore it has been possible to provide soft serve ice-cream, containing solids, in cups, to the retail customers. But such servings of custom-ordered ice-cream have been possible only in the cups in which the mixing is done and many customers much prefer cones.

However, it is not practical to mix ice-cream while it is in a cone as cones are very weak and can break. In addition ice-cream mixed in a cone would not extend up out of the cone as is the way the public expects ice-cream cones to be served.

Transferring ice-cream from a mixing cup to a cone by pouring has not been practical because it is thick and it clings to the mixing cup. Also, it cannot be shaped up into a swirl extending above the cone, and such an attractive cone is expected because it can be done without solid ingredients in a ice-cream machine.

There has been needed some way to have ice-cream freshly mixed and served in cones with the overflowing ice-cream high above the cones, but with solid ingredients.

In the prior art ice-cream dispensing freezers, commonly called ice-cream machines, have been widely used at ice-cream stands. Some of them have a handle which can be pulled down in three different postions for delivering three different flavors, the flavors being mixed while the valve is open. The outlet of such a machine is shaped for delivering an attractive swirl to the ice-cream as the operator holds the cone under the outlet, moving the cone in a circle.

However, even though such machines can deliver a flavor, they cannot pump solid ingredients, so some kind of other process has been needed to add other ingredients to soft-serve ice-cream.

An objective hereof is to provide a way to do much that a freezer dispenser could do, including shaping the ice-cream into a swirl speedily, but, in addition, providing a product containing selected solid ingredients.

Another objective is to make use of a power-mixer machine which speedily mixes the ingredients into a cup. One then places the cup in an ice-cream ejector hereof so that a quick, almost effortless pulling of a plunger can eject the ice-cream down through a shaping outlet to provide a swirl effect whereby a very attractive cone is produced filled with solid ingredients.

Another object is to provide a cup having an open bottom on which a cap is received to close the bottom at a time when the cup is holding ice-cream during the mixing thereinto of ingredients in the mixer of a prior art. The cap is then removed so that, as the plunger hereof presses downwardly into the top of a cup, ice-cream is ejected out the bottom at an outlet which has been uncovered by the removal of the cap.

Another objective is to provide a shelf having an opening therethrough into which a lower part of the cup can extend, the shelf having a recess on its upper side larger than the lower most part of the cup opening for receiving a portion of the cup. The walls of the recess support the cup during ejection of ice-cream therefrom.

Yet another objective is to provide a shelf with a slidable mounting into the frame so that the shelf can be pulled to the front for ease of emplacement of the cup.

The cup can be put in place and removed from the ejector without interference from the piston by doing these things while the shelf is in the outer position.

Good visability of the ice-cream outlet is important. An object hereof is to provide the cup support shelf with a cutaway portion giving this visability for speedy making of attractive cones.

Other objectives are to provide a quick disconnection system for the piston head. With this the piston head can be quickly removed for soaking and cleaning and easily replaced on the piston rod.

Another objective is to provide a cover removably attachable to the piston head which can be replaced after making one type of cone to prevent its flavor from conveying into another flavor being made next. This is important because the number and variety of ingredients and flavors are unlimited.

Another objective is to provide an efficient way to quickly exchange the piston cover, by use of a pull-out cup support shelf which can be pulled out for easier access to both the piston and the cup.

For good speed the ejector hereof has a short hand-pumping stroke, accomplished herein by a wide cup, much wider than the cone. Therefore the diameter of the cup at its inlet is much larger than at the cup outlet.

Flow to the outlet is made substantially better for ease of pumping by having the inner wall of the cup hereof inclining inwardly and downwardly toward the outlet and thereby defining a frustro-conical ice-cream flow guiding inner wall area.

The outer wall of the piston hereof also has an external frustro-conically shaped undersurface by which a self-aligning of the piston is accomplished so that as the piston enters the cup it is guided toward registry with the cup.

The cup hereof has at its lowermost end a spout useful to receive thereon a cap for use when mixing prior to ejection. The piston is provided with a projecting portion projecting ahead of its resilient header and capable of substantially filling the spout to eliminate a problem with waste ice-cream from incomplete ejection.

If a cover is not attached to a piston it could be expected that the cover would stay in the cup after piston withdrawal necessitating a time-consuming fishing of a used cover out of a cup. However, experiments have shown that a cover need not be attached if a preferred piston-with-header piston-modification hereof is used, and yet the cover will be found to automatically and desirably come out of the cup with the piston. The cover need only to simply rest against a resilient header which is piston-attached and which extends across the front of the piston, and yet it has been found that the cover will desirably cling to the resilient header as the header leaves the cup, apparently because of a slight gripping of the cover around the edges of the headers.

Another discovery is that even very inexpensive thin wax paper can be simply lain across the top of the cup and that the wax paper will not shear upon piston entry, likely because of the gentle resiliency of the header edges. Also, it has been found that the thin paper cover will not shear upon reaching the constricted spout area of the cup, if the piston fits the spout area not too tightly.

An objective is to provide a more sanitary way, using a pin, to attach the piston to the piston rod with fewer difficult-to-clean bacteria-harboring crevices.

BRIEF DESCRIPTION OF THE DRAWINGS

FIG. 1 is a left side elevation of the ice-cream ejector hereof with most of its left outer wall removed to show the interior. The plunger is shown in a position preparatory to entering the top of the ice-cream cup from which ice-cream is being ejected into a cone. The cone at the stages of FIG. 1 and 2 would have no ice-cream in it. But ice-cream is shown anyway for understanding.

FIG. 2 is a frontal elevation of the ejector of FIG. 1 but with the plunger partially entered into the top of the cup.

FIG. 3 is a side-elevation of an ice-cream cup from which ice-cream is to be ejected, parts being broken away. The position of a cap on the cup is shown in dotted lines because it is not on the cup during ejection, but only during a mixing of ice-cream and ingredients in a mixer in the stage of production previous to ejection.

FIG. 4 is a top plan view of the ice-cream cup with only a broken away portion of the piston in it.

FIG. 4A is a top plan view of the cap.

FIG. 5 is a frontal elevation in detail of a piston with the forward half of the cover broken away and with a portion of the center of the piston broken away showing the lower portion of the piston rod. The latch is shown in locking position. The thermoplastic waterproof cover of flat material is shown.

FIG. 6 shows the top view of a piston with the latch in a unlocked position with respect to the piston rod. The upper part of the piston rod is broken away.

DESCRIPTION OF THE PREFERRED EMBODIMENT

Figure 7:
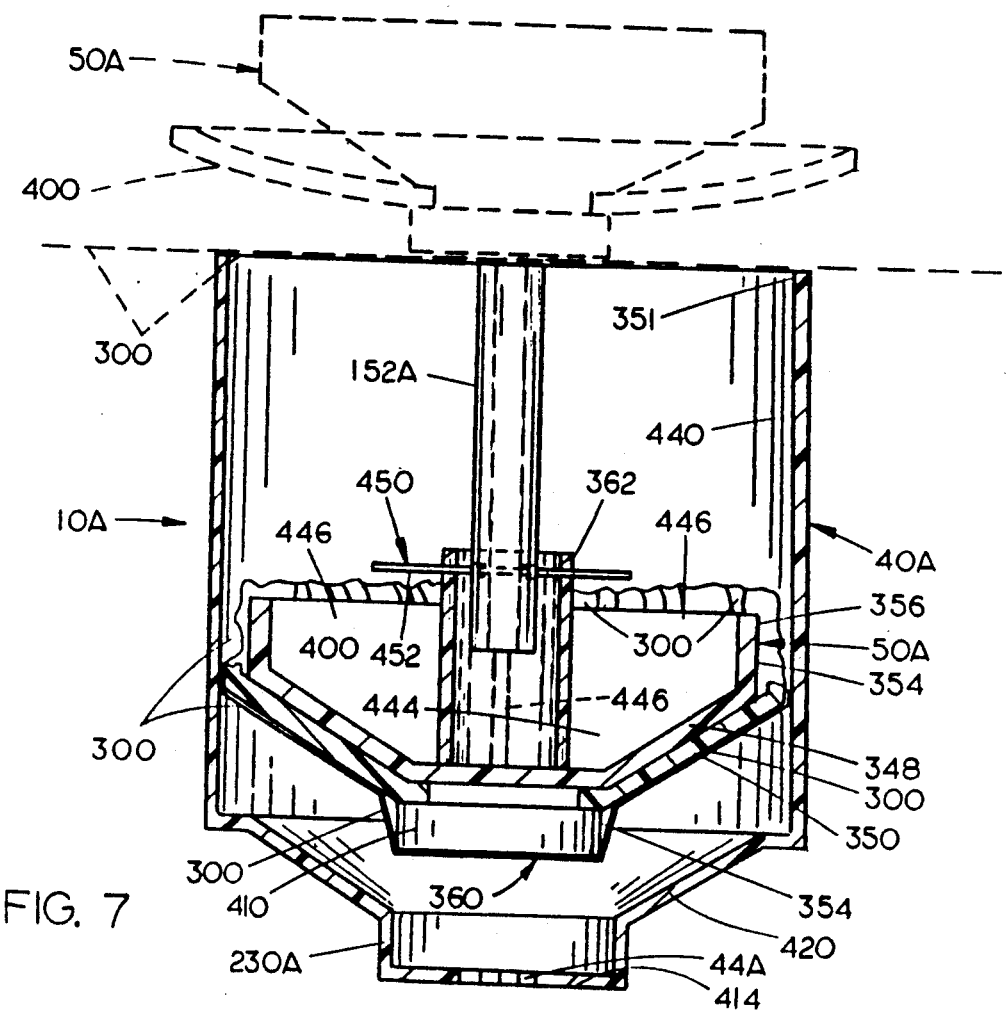
FIG. 7 is a frontal elevation of a modified cup hereof with its forward half broken away. A modified piston, its header and its cover are shown in full lines with their forward halves broken away. The piston is shown attached to a piston rod by a holding pin. The positions of the parts previous to entry of the piston into the cup are partially shown in dotted lines.

In FIG. 1, the ice-cream ejector 10 hereof is for ejecting ice-cream 20 filled with solid ingredients 22 into an edible cone 30.

The ejector 10 has a frame 34 holding a cup support 36 having an opening 38 extending downwardly therethrough.

During ejection, a cup 40 is supported in and on the support 36. The cup 40 is the same cup in which solid ingredients have been previously mixed into the ice-cream in a high powered mixer located at the retail location and disposed on the public counter alongside the ejector 10.

The cup 40 has an upper inlet 42 and a lower outlet 44 and has thick ice-cream clinging to its inner side ready to be ejected.

A piston 50 is slidably received in the cup 40 and is removable from the ejector 10 for ease of replacement of a disposable flexible piston cover 330.

A hand lever 60 presses the piston 50 downwardly, pressing ice-cream 20 from the cup outlet 44 into a hand-held cone 30 ready for serving.

The cup support 36 is a shelf horizontally slidable on the frame 34.

The cup 40, when in operational position, has its downwardly opening outlet 44 aligned with the support opening 38.

The frame 34 and the support 36 define a structure module 70 on which there is a counterbore or larger diametered recess 72 which is large enough to receive substantial parts of the cup 40 which are upwardly of its lower end so as to support the cup 40 in an upright operational ice-cream ejection position.

A flexible disposable cover 80 covers at least a substantial part of the lower end of the piston 50. The piston 50 has a projection 84 on its lower side and at its center. The projection 84 has an enlarged lower end portion 86 connected to the remainder of the piston 50 by a narrow neck 88.

The cover 80 has a hole 88 therethrough capable of snuggly receiving the enlarged lower end portion 86 by stretching the cover 80 thereover so that it is received on the neck 88. The cover 80 can be easily replaced with a clean cover so that a cover used in an earlier ejection will not deliver a different and undesired flavor to ice-cream later being ejected.

In FIG. 5 and 6 a removable attachment module generally indicated at 120 is shown and it has as one of its parts a recess shown at 122 extending downwardly from the top of the piston 50 to receive the lower end of the piston rod 152.

In FIGS. 2 and 5, the thermoplastic waterproof piston cover 80 is shown in its ice-cream pushing position with its edges having been automatically pressed upwardly and folded into pleats 79 as the piston enters the cup, as has been discovered to be automatic and to make practical the use of flat thermoplastic stock.

The piston 50 has a main portion 51. The cover 80 has a substantially horizontal lower portion 81 extending across the bottom of the piston 50.

It is in the lower portion 81 of the cover that the hole 88 extends vertically therethrough.

The hole 88 has a wall 89 fitting closely against the neck 92.

The cover 80 is formed of a waterproof material of sufficient resiliency so that the wall 89 of the hole 88 tightly engages the neck 92 substantially protecting the main piston portion 51 from contact with ice-cream coming from the underside of the piston 50 in an upflow along the neck 92.

A notch 128 surrounds the piston rod 152 a short distance above its lower end 132. The notch 128 in the rod 152 is for receiving a latch 130 which is a sliding plate arranged with its top and bottom planar sides in horizontal planes. The latch has an opening, generally indicated at 134, extending therethrough.

The opening 134 has an enlarged portion 136 at one of its ends and has a restricted portion 138 at its other end. The enlarged portion 136 is capable of fully receiving the lower end of the piston rod 126 but the locking portion 138 of the opening 134 has parallel sides close enough together to be snugly and slidably received in the notch 128.

The latch 120 is slidably secured to the horizontal topside 148 of the piston by means of screws 150 with screw heads which lap over the upper side opposite edges of the latch 120.

In this way the latch 120 is slidably confined with respect to the piston for reciporcation movements in the direction of the arrow 162 for latching, and the direction of the arrow 163 for unlatching.

The piston actuation module is shown in FIG. 1 at 150 and has a piston rod 152 extending vertically downward to a pivotal connection to the piston 50 because of the removable attachment module 120 of FIGS. 5 and 6 using the latch 130.

The upper end of the piston rod 152 is pivotally attached at a first point 156 to an elongated hand lever 60 by means of a bolt 160. Rearwardly of the point 156 is a second pivot point 164 where a bolt 166 attaches the lever 60 to an anchoring link 168 which extends vertically having a lower end which connects at a pivot point 170 by means of a bolt 172 to an ear 174 fixed to the frame 34.

The ear 174 is fixed to a horizontal frame member 178. The lever 60 projects forwardly away from the frame 34 and is free to swing upwardly and downwardly in an opening 179 about the second pivot point 164.

A handle 180 on the outer end of the lever makes it convenient for the operator to pull down the forward end 182 of the lever making the piston rod 152 descend for causing the piston 50 to push ice-cream downwardly out of the cup 40

The cup 40 has an upper portion having a cylindrical inner wall 188 slidably receiving, snugly, the piston 50 which is circular in outline in top plan view as seen in FIG. 5.

The cup 40 has an upper inlet 42 through which the piston can descend and has a lower outlet 44 which preferably has a wall 194 which can be of the shape of a many pointed star.

The cup has a frustro-conical section 216 which has a frustro-conical outer wall 218, and also a frustro-conical inner wall 219.

The frustro-conical section 216 is attached to the cylindrical upper cup section 222.

A lower cup section 230 has a cylindrical outer wall 230 and a cylindrical inner wall 234 and is attached to the lower end of the frustro-conical section 216. It is in the lowermost end of the lower cylindrical cup section 232 that the outlet 44 is provided in a horizontal bottom wall 238.

The frustro-conical outer wall 218 of the section 216 nests snugly in a lower opening portion 250 of a cup support 36 as seen in FIG. 1, having a total opening 38 therethrough.

An upper cylindrical wall 256 of the opening 270 through the support 36 receives a lowermost portion of a cylindrical sidewall 272 of the upper cylindrical cup section 220.

In FIG. 1, the upper cylindrical wall portion 221 and the opening 38 in the cup support 36, snugly receives the upper part of the cup giving the cup support so as to hold it in a vertical position. The cup support 36 preferably is a shelf and can slide forwardly and rearwardly between track-way members 292 fixed to the sidewalls 302 and 304 of the frame 34 as seen in FIG. 2 for sufficient ease of cup insertion.

In operation ice-cream is first run into the cup 40 from an ice-cream machine, not shown. Next the cup is placed on the propeller of a mixing machine and solid ingredients are mixed into it, while the outlet 44 of the cup is closed by a cap 300 seen in FIG. 4A. The cap 300 has a handle 312 and the cup can also be seen in FIG. 3 in dotted lines.

After the solid ingredients have been mixed in the cup 40, the cap 300 seen in dotted lines in FIG. 3 is removed from the cup.

Next, the support shelf can be pulled forward to the right as seen in FIG. 1 into the dotted line position, partially out of the frame 34. Next comes the placement of the cup 40 on the opening 38 of the support shelf 36 and sliding the shelf in fully to place the cup 40 under the piston 50.

Next, to eject the ice-cream, the handle 180 is pulled down, pushing the piston 50 down into the cup 40 forcing the contents out through the outlet 44 thereof.

The frame 34 has sidewalls 302 and 304 and a short forward wall 306 at the top of the frame 34 having the lever opening 179 therethrough. The lower part of the forward side 322 of the frame is open at 320. The opening at 320 makes it easy for the operator to hold the cone under the outlet 44 to move the cone in a circular motion to build an attractive swirl of ice-cream and solid ingredients that more than fill the cone.

In FIG. 1, the sighting of the outlet end of the cup 40 for good control is made easier by a cutting away of the cup support shelf 36 from its forward side inwardly to its cup receiving opening 38 to form a sighting notch 310.

The piston 50 is quickly removed by unlocking the latch 130 by pulling on its handle 131.

The piston 50 can also be cleaned, periodically, while it is removed.

After a cone has been made the next cone may be a different flavor and so it is necessary to remove the cover 80 and replace it with another to prevent the flavors from becoming mixed. This replacement of the cover 80 is made easy by the fact that the change of covers 80 can be done while the piston 50 has been removed from the machine.

A great total speed is possible because of the ease of frequent removal of the piston to quickly change the piston cover 80 and also to clean the piston 50. Speed is also enhanced by the ease of putting the cup 40 in the shelf support 36 because it conveniently slides out far enough for this.

Speed control is excellent at the lever 50. These speed factors are very important in the fast moving ice-cream stand business.

In the modified ejector 10A, the parts identical with parts of the modification of FIGS. 1 to 6 are given no numbers, having been previously described, many identical parts not being shown a second time at all.

Figure 8:
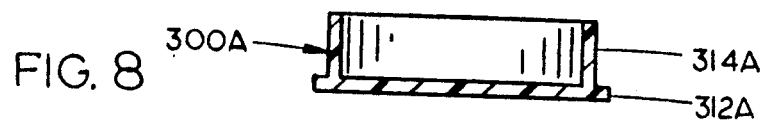
FIG. 8 shows a modified cap diagramatically with its forward half broken away and removed from the cup. Actually it would be out of the machine when the pumping stroke is started.

However, many parts are changed, improved, new, and different in FIGS. 7 and 8 from FIGS. 1 to 6.

The cup 40A of FIG. 7 is identical to the cup 40 of FIG. 3.

The cap 300A of FIG. 7 differs in having a handle ridge 3212A completely surrounding and projecting from all sides of the lower part of the sidewall 314A of the cup 300A.

The piston 50A of FIG. 7 is, however, much different than the piston 50 of FIG. 1. The piston 50A has an aligning portion 348 having a frustro-conically shaped external aligning-guide surface 350 extending inwardly and downwardly from an upper cylindrical outer surface 354 of the main portion 356 of the piston 50A.

The aligning-guided surface 350 extends down to a circular header-receiving recess 354 for receiving a resilient header 400. The recess 354 surrounds the upper part of a cylindrical projecting portion or projection 360.

The external frustro-concially shaped undersurface 350 engages the upper edge 351 of the cup 40A guiding so that as the piston enters the cup it is guided toward registry with the cup in a self-aligning fashion.

The projection 360, or projection portion 360 of the piston 50A is of one-piece of thermoplastic material with the inclined aligning piston portion 348 and the cylindrical main piston portion 356 and with a piston-rod receiving portion 362 later described.

The cup 40A hereof has at its lowermost end a spout 230A useful to receive thereon the cap 300A of FIG. 8 for use when mixing prior to ejection but removed from the ejector before ejection.

The spout 230A is identical to the lower cup section 230 of FIG. 3 and also has an outlet 44A.

The piston projecting portion 360 and the resilient header 400 and the pushing portion 410 substantially eject all ice-cream from the cup 40A. The pushing piston 410 is capable of substantially filling the interior 414 of the spout 230A to eliminate a problem with waste ice-cream from incomplete ejection. Experiments have shown that a cover need not be attached if this preferred piston-with-header piston-modification hereof is used, and yet the cover will be found to automatically and desirably come out of the cup when the piston comes out.

Flow to the outlet 44A is made substantially better for ease of pumping by having an inner flow-guiding wall 420 of the cup 40A hereof inclining inwardly and downwardly toward the outlet 44A and thereby defining a frustro-conical ice-cream flow guiding inner wall area 420.

The header 400 is circular in periphery and is made of food grade neoprene and has been successful at a thickness of one-eight inch with the header extending about one-fourth inch beyond the circular circmference of the main portion 354 of the piston, although this can vary somewhat. FIG. 1 is drawn substantially at full scale.

The wax paper cover 330 of FIG. 7 is imperforate and is of any common thickness for kitchen household use.

The thermoplastic cup 40A has a cylindrical main portion interior wall 440. Paper cups of that same shape could work but paper cups do not work well because of their tapered interior walls.

The piston 50A has recesses 444 in its interior separated by webs 446.

Figure 9:
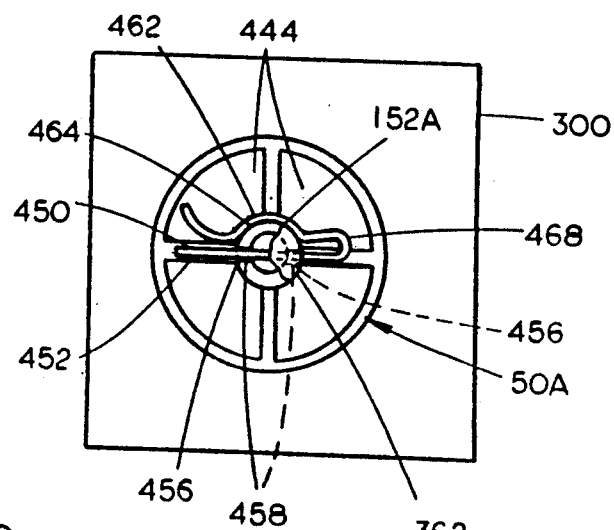
FIG. 9 is a top plan view of the parts of FIG. 7 shown in full lines with the piston in retracted upper position and the cover shown in a horizontal plane.

In FIG. 9 a keeper or resilient clip 450 has a pin portion 452 extending through a keeper hole 456 in the mounting portion 362 and through an aligned rod opening 458 in the rod 152A.

The keeper 450 has a holding portion 462 disposed on the outside of the mounting portion 362 and having a recess 464 receiving thereagainst the outer side of the mounting portion 362.

The keeper 450 has a connecting portion 468 which is a loop and which connects the pin portion 452 to the holding portion 462. The entire clip or keeper 450 is formed of flexible resilient material, such as stainless steel, so that it can be easily removed for removing the entire piston 50A for cleaning.

The cover 300 can be made of thermoplastic and work well as described and shown in FIG. 7.

I claim:

1. An ice-cream ejector having:

a frame, a cup support attached to said frame and provided with a cup-receiving opening extending downwardly therethrough from its upper side, a cup disposed in said opening and supported by said support, said cup having an upwardly opening inlet and a downwardly opening outlet, a piston slidably received in said cup, hand-operable means attached to said piston and said frame and capable of pressing said piston downwardly in said cup for pressing ice-cream through said outlet, said outlet being smaller than said inlet, a flexible disposable cover covering the underside of said piston so that a cover used in an earlier ejection will not deliver a different and undersired flavor to ice-cream later being ejected, said cover being held in place merely by engagement with said piston and said cup whereby said cover can be quickly replaced with a clean cover so that a cover used in an earlier ejection will not deliver a different and undesired flavor to ice-cream later being ejected, said cover material being waxed paper, said cover being of flat flexible stock capable of folding into pleats at the edges of a piston as said piston moves through said cup, a lever, anchor means pivotally attaching said lever to said frame at a first point, said hand operable means comprising piston connecting means pivotally attaching said piston to said lever at a second point horizontally spaced from said first point, said anchor means and said piston connecting means allowing said piston to move substantially in a straight line downwardly in said cup when said lever is pulled downwardly adjacent said second point, said anchor means further comprising an anchoring link pivotally connected to said frame, the pivot connections of said link-to-frame and of said link-to-lever, and of said piston connecting means permitting rotation only about horizontal axes, said axes being parallel, said lever having a handle end projecting forwardly from said frame, the manual pulling down of said handle causing said piston to move downwardly, said piston connecting means further comprising a piston rod, said piston being attached to said piston rod by a piston attachment assembly comprising said piston having a main portion and an upwardly protruding mounting portion of lesser horizontal size than the horizontal size of said main piston portion, said mounting portion being adjacent and above at least sections of said main portion, said mounting portion having a keeper hole therethrough, said rod having a rod opening therethrough, a keeper removably disposed in said keeper hole and said rod opening and attaching said piston mounting portion removably to said rod, said keeper being a pin extending through said keeper hole and said rod opening, and a pin holder attached to said pin and engagable with said piston mounting portion for releasably holding said pin in said keeper hole and said rod opening, said cup support having an opening extending vertically therethrough, the walls of said support opening holding said cup in upright position during ejection, said support being a support shelf slidably attached to said frame by fixed guide means and capable of being pulled outwardly away from said frame for ease of implacement of said cup into said support shelf and for quick removal of said cup from said support shelf, said cup having a shoulder means on its exterior which engages said cup support for supporting said cup, the outlet of said cup being disposed below said shoulder means, said outlet of said cup being disposed below the bottom of said support, said piston having a sidewall and having an undersurface tapering from said sidewall inwardly and downwardly so that as said piston enters said cup said piston is automatically guided toward registry with and into said cup, said cup having an inner wall having at its lower end a constricted spout portion, said piston having a main piston portion, said piston having a pushing portion of lesser size than said main piston portion, said pushing portion being capable of substantially filling said spout portion of said cup to substantially push the ice-cream therefrom.

* * * * *